United States Patent
McGillvary

[15] 3,701,374
[45] Oct. 31, 1972

[54] ELASTOMERIC ARTICLES FREE FROM REINFORCING ELEMENTS

[72] Inventor: Daniel R. McGillvary, Massillon, Ohio

[73] Assignee: The Firestone Tire & Rubber Company, Akron, Ohio

[22] Filed: July 6, 1970

[21] Appl. No.: 52,150

[52] U.S. Cl. ............... 152/330, 74/231 P, 92/34, 138/177, 260/77.5 AM, 260/82.1
[51] Int. Cl. ............... C08g 22/04, B60c 5/00
[58] Field of Search ....... 260/77.5 AM, 94.2 R, 77.5, 260/82.1; 152/330

[56] References Cited

UNITED STATES PATENTS 3,208,500  9/1965  Knipp et al. ............... 152/327

OTHER PUBLICATIONS

Athey, Rubber Age, 85, No. 1, 1959, pp. 77–81
Buist et al., Advances in Polyurethane Technology, Maclaren & Sons, Ltd, London, 1968, pp. 42–53

Primary Examiner—Donald E. Czaja
Assistant Examiner—M. J. Welsh
Attorney—S. M. Clark and Willard L. G. Pollard

[57] ABSTRACT

Pneumatic tires and other elastomeric articles subject to tensile stress and dynamic flexure in service, said articles having no reinforcing elements, or having reinforcing elements in portions only thereof, are made from elastomers having, in the cured state, a molecular weight between covalent cross-links of 5,100 – 40,000, and a molecular weight between electrostatic cross-links of 800 – 5,000. Such articles exhibit excellent strength, elasticity, tear resistance, flat-spotting properties and overall performance in service, both at ambient and elevated temperatures.

8 Claims, 3 Drawing Figures

PATENTED OCT 31 1972

3,701,374

ELASTOMERIC ARTICLES FREE FROM REINFORCING ELEMENTS

BACKGROUND OF THE INVENTION

1. Field of the Invention

This invention relates to pneumatic tires, air springs, power transmission belts, and other articles subjected to tensile stresses and dynamic flexure in service, at least portions of which articles are free from reinforcing fabrics. In some of its more particular aspects, the invention relates to the production of such articles by molding from flowable materials, as by centrifugal casting, injection molding, transfer molding and like processes.

2. Description of the Prior Art

Pneumatic tires, air springs, hoses, transmission belts and other articles subject to tensile stresses and dynamic flexure in service are conventionally fabricated by laying up of plies of elastomeric materials containing textile reinforcing textile elements. It would be highly desirable to dispense with the reinforcing elements, as it would then be possible to mold the article directly from the elastomeric material, or a precursor thereof, in flowable form, rather than to go through the laborious lay-up procedures required to place the reinforcing textile elements in their required location in the articles. It has not heretofore been practical to dispense with the reinforcing elements, however, because the elastomer compositions available have not had the requisite high modulus, tensile strength, tear resistance and creep resistance in conjunction with flex resistance that would be required in such articles not containing textile reinforcing elements. It will be appreciated that the flex resistance on the one hand, and the modulus, tensile, tear and creep resistance on the other hand, are mutually antagonistic properties, and that it is difficult to secure satisfactory values of all of these properties simultaneously in a single stock.

Accordingly, it is an object of this invention to provide elastomeric stocks having the physical properties required in articles from which the reinforcing elements have been partially or entirely omitted. Another object is to provide such a stock which, prior to vulcanization, is readily flowable, so that articles may be formed therefrom by centrifugal casting, injection molding, transfer molding and the like.

SUMMARY

The above and other objects are secured, in accordance with the invention, in pneumatic tires, air springs, hoses, power transmission belts and other articles subjected to tensile stresses and dynamic flexure in service, said articles being partially or wholly without reinforcing textile elements. These articles are made from elastomeric stocks of the type having, in cured form, both covalent cross-links and also electrostatic cross-links, van der Waals forces or other intermolecular association cross-links, hereinafter referred to as "electrostatic cross-links." The composition and curing conditions of the elastomeric material are so selected that A. the molecular weight of the polymeric chains between the electrostatic cross-links is 800–5,000, and preferably 1,000–3,000, and B. the molecular weight of the chains between covalent cross-links is 5,100–40,000 and preferably 10,000–20,000.

Such cured elastomers have physical properties requisite for articles of the types referred to, or portions of such articles, without the necessity for including reinforcing textile elements therein, and specifically, have the following key physical properties:

| | |
|---|---|
| Tensile strength at 212°F. (100°C.) | $\geq$ * 1800 psi |
| Crescent tear strength at 212°F. (100°C.) | $\geq$ 200 pounds/inch |
| DeMattia flex life at 176°F. (80°C.) | $\geq 2 \times 10^6$ cycles |

* " $\geq$ " Signifies "equal to or greater than"

Advantageously, elastomers meeting the above requirements may be made, by techniques described below, from precursors which are readily flowable, so that tires and other articles according to this invention may be prepared by low-labor-cost centrifugal, injection- and transfer-molding processes. Particularly, the articles of this invention may be constituted of elastomeric polyurethanes made from poly(alkylene glycols) end-capped with diisocyanates and cured with diamines and/or diols substantially in excess of the usual sub-stoichiometric quantities.

THE DRAWING

In the drawing

FIG. 1 is a sectional view of a tire according to this invention, completely without any reinforcing elements;

FIG. 2 is a sectional view of a tire according to this invention, wherein reinforcing cords are provided at the interface between the body of the tire and a tread portion in the area of the tread only, the sidewalls being without any reinforcing elements, and FIG. 3 is a sectional view of a tire according to this invention, wherein reinforcing cords are provided at the interface between the body of the tire and a tread portion in the area of the tread, and also extend for a substantial distance down the sidewalls, the remainder of the sidewalls being without any reinforcing elements.

DESCRIPTION OF THE PREFERRED EMBODIMENTS

The Elastomers Used In This Invention

Figure 1:
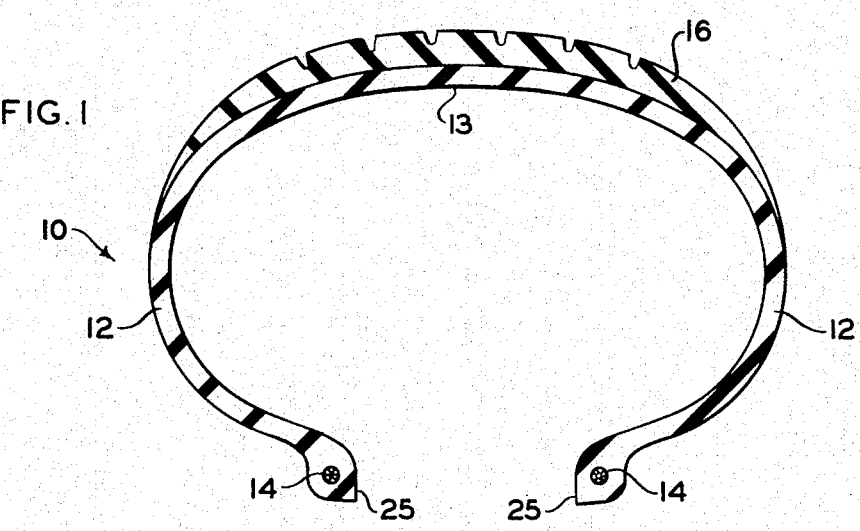

Elastomers suitable for use in this invention include any generally linear high polymers, the chains of which are of elastomeric character, i.e., having second order transition temperatures below about −20° C., and which contain groupings along the chains capable of forming electrostatic space force cross-links and also groupings capable of forming true covalent cross-links. In many cases the same groupings are capable of establishing either one of these types of cross-links. Suitable elastomers include the (preferred) polyurethane rubbers, particularly those formed by capping the hydroxyls of polyalkylene glycols of molecular weight in the range of 800–2,500 with diisocyanates to form prepolymers, and then chain-extending and curing the prepolymers by means of diamines and/or diols. Suitable polyalkylene glycols are exemplified in poly(alkylene glycols) having molecular weights in the range of 800–2,500 based on alkylene groups of from two to 10 carbon atoms such as poly(ethylene glycol), poly(propylene glycol), poly(trimethylene glycol), poly(tetramethylene glycol), poly(hexamethylene glycol), high molecular weight copolymers of these glycols, and mixtures of the various poly(alkylene glycols) individually falling within the above categories. Suitable diisocyanates are exemplified in compounds having two isocyanate groups linked to an organic residue of six to 16 carbon atoms such as hexamethylene diisocyanate, the various tolylene diisocyanates, the various naphthalene diisocyanates, 4,4'-diphenylmethane diisocyanate, 3,3'-dimethyl-4,4'-diphenylmethane diisocyanate, 4'-diphenyl-isopropylidene diisocyanate, 3,3'-dimethyl-4,4'-biphenyl diisocyanate, the phenylene diisocyanates, 3,3'-dimethoxy-4,4'-biphenyl diisocyanate, and the like. Suitable diamines are those containing an organic central radical of two to 20 carbon atoms linked to two amino groups such as ethylene diamine, tetramethylene diamine, hexamethylene diamine, p-phenylenediamine, methylene-bis-2-chloroaniline ("MOCA"), 4,4'-diaminodiphenylmethane, 3,3'-dichloro-4,4'-diaminodiphenylmethane, benzidine, 3,3'-dimethylbenzidine, 3,3'-dimethoxy benzidine, 3,3'-dichlorobenzidine, and the like. In these rubbers the chains of cured polymer contain the repeating linkage

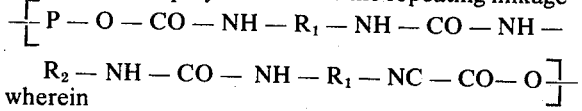

wherein

P represents a high molecular poly(alkylene ether) chain derived from a poly(alkylene glycol) such as specified above;

$R_1$ is the organic radical of a diisocyanate such as specified above and $R_2$ is the organic central radical of a diamine such as specified above.

Electrostatic cross-links tend to form between the CO groups and ether groups and the hydrogen atoms on the nitrogen atoms on adjacent chains; and the isocyanate groups of the prepolymer react in a certain proportion with these hydrogen atoms to form covalent cross-links. It is the control of the magnitude and proportions of the respective amounts of these two types of cross-links that underlies the critical characteristics of the articles of this invention. A particular advantage of the preferred polyalkylene glycol/diisocyanate/diamine-based elastomers is the fact that prior to final cross-linking, they are flowable for a sufficient period of time so that they may be formed by centrifugal, injection or transfer molding into the form of the desired article. With flow-molding processes of these types, it is extremely difficult to include reinforcing cord, hence the rubbers of this invention are particularly advantageous in the cured state because they are able to function in an article subject to tensile and dynamic flexure stresses without the presence of reinforcing cords.

Besides the ether urethanes, there may also be employed polyester urethanes, and also other elastomers capable of establishing both electrostatic and covalent cross-links, such as copolymers of (A) butadiene, isoprene, acrylic esters or other monomers, polymeric chains from which are of essentially elastomeric character with (B) monomers containing salt-forming groups such as acrylic acid, methacrylic acid, maleic acid, fumaric acid, itaconic acid and the like.

The Electrostatic Cross-Links and the Covalent Links

As noted hereinabove, the distribution of the cross-links in the vulcanized elastomers in the tires of this invention must be characterized by Molecular weight of polymer chains between electrostatic cross-links equalling    800 to 5000 (preferably 1000 to 3000)

and

Molecular weight of polymer chains between covalent cross-links equalling    5100 to 40,000 (preferably 10,000–20,000)

The methods of ascertaining these two characteristics involve known solvent swelling procedures described generally in Cluff et al., J. Pol. Sci. 45 pp. 341–345 (1960). Swelling procedures involving non-polar solvents such as chloroform reflect the spacing of electrostatic cross-links, since non-polar solvents do not disrupt such cross-links. Swelling procedures conducted in polar solvents, such as tetrahydrofurane, on the other hand, reflect the spacing of the covalent cross-links, since the electrostatic cross-links are dissociated by such solvents. It will be understood, therefore, that the conformity-or-not of a rubber to this invention is to be ascertained with respect to electrostatic cross-links by swelling measurements conducted in chloroform or some other non-polar solvent; and with respect to covalent cross-links, by swelling measurements conducted with tetrahydrofurane or some other polar solvent capable of dissociating electrostatic cross-linkages.

Regarding the formulation and curing of elastomers so as to develop the types of cross-links desires, the factors influencing these parameters are well understood by those in the art. With particular reference to the preferred polyurethanes discussed above, it is necessary to use unconventionally high ratios of curing amine to free isocyanate in the prepolymer, say about 0.98–1.08 equivalents of diamine* (* The equivalent weight of a diamine is one-half of its molecular weight.) per equivalent of isocyanate in the prepolymer. Within this range the molecular weight between covalent cross-links will increase to a maximum, and adjustments can be made up and down as may appear desirable. The molecular weight between electrostatic cross-links is in general an increasing function of the molecular weight of the poly(alkylene glycol) employed, and this factor can be increased and decreased by selection of higher or lower molecular weight poly(alkylene glycol) starting materials. Likewise lower curing temperatures tend to increase the molecular weight between covalent cross-linkages. Generally temperatures in the range 125°–325° F. (51°–163° C.) will be employed, and adjustment of the molecular weight between cross-links can be further adjusted by varying the curing temperature within this range.

Physical Properties of the Elastomers

The elastomers used in the tires of this invention have the following critical properties.

| | |
|---|---|
| Tensile strength (at 212°F.) | ≥1800 psi |
| Crescent tear strength (at 212°F.) | ≥200 pounds/inch |
| DeMattia flex life (at 176°F.) | ≥2×10⁶ cycles |

These properties are extremely important in themselves for a rubber in a tire or other article subjected to tensile stress and dynamic flexure in service unsupported by reinforcing cord, and they moreover, in the experience with the instant invention, have been found to entrain the following properties at ambient temperatures (ca. 25° C.) which are also of great importance in this context:

Modulus of elongation of:
  250–400 psi at   5% elongation
  1100–1300psi at  100% elongation
  1400–1550psi at  200% elongation
  1600–1800psi at  300% elongation
  2000–2200psi at  400% elongation
  2800–3500psi at  500% elongation
Tensile strength              ≥2800 psi
Elongation                    ≥400%
Young's flexural modulus      10,000–15,000 psi Pneumatic tires cast or otherwise formed, wholly or partially without reinforcing cords, from elastomers of the above characteristics, withstand inflation at customary pressures without undue or uneven expansion, and without creep over a duration of time; are resistant to cuts, breaks and other road damage in service; and are highly resistant to abrasive wear and to failure from flexure. Pneumatic tires heretofore fabricated from polyurethane or other rubbers have invariably been subject to rapid deterioration in service due to dynamic flexural failure.

DETAILED DESCRIPTION OF THE DRAWINGS

Referring now more particularly to FIG. 1, there is shown a cross section of a pneumatic tire indicated generally at 10, having a body comprised of sidewalls 12 and an under-tread portion 13, all made from the elastomer of the type specified hereinabove, and all devoid of any reinforcing cords. The bead portions 25 have bead wires 14 running therearound. A tread portion 16 is shown as a separate body of rubber adhered to the under-tread-portion 13 and also devoid of reinforcing cords; in many cases this will be the same identical composition as the body 12, 13, and in such cases it will be, of course, continuous with the body 12, 13. In other cases, it may be desired to apply a separate tread portion of a composition more particularly designed for that service, with emphasis on abrasion resistance, road traction, noise abatement, etc. Since there are no reinforcing cords to complicate operations, the tire may be readily formed, from liquid elastomer precursor compositions meeting the criteria of this invention, by centrifugal casting. The bead wires 14 may be supported in place by small blocks of precured elastomer, or by pins in the mold, during the casting operation. In those cases where the tread portion 16 is of a composition different from the main body 12, 13 of the tire, the portion 16 may be formed by either initially pouring a liquid elastomer precursor of the desired composition, or by laying in a solid band of the desired composition and configuration, and then pouring the precursor for the main body 12, 13.

Figure 2:
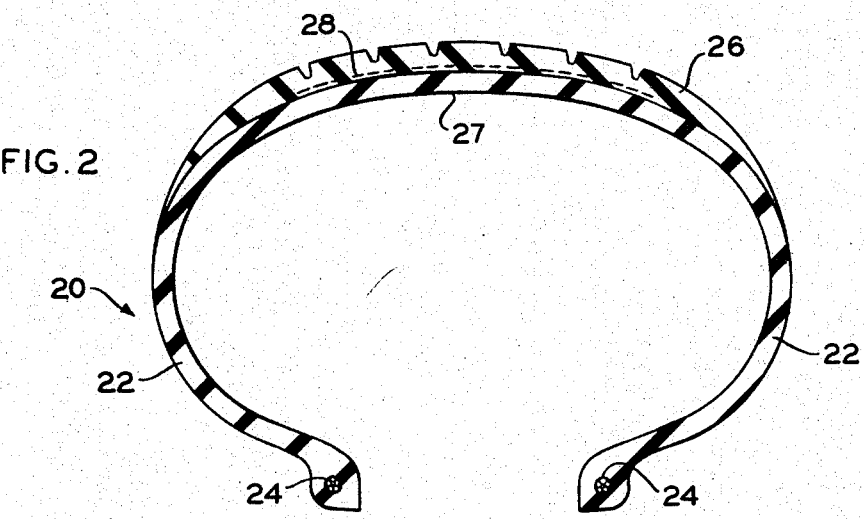

Referring to FIG. 2, this shows a pneumatic tire having sidewalls 22, 22, bead wires 24, and under-tread portion 27 similar to the elements 12, 12, 14 and 13 respectively of the tire of FIG. 1. However, in this embodiment the tread portion 26 has reinforcing cords 28 imbedded therein at the interface between the tread portion 26 and the under-tread portion 27 to strengthen the tread portion and/or confine the squirming action of the tread. The tire of FIG. 2 may be manufactured by making the tread portion 26 as a solid preform with the cords 28 imbedded therein, inserting the same into a centrifugal mold, and then pouring the liquid elastomer precursor in accordance with this invention. It will be appreciated that this is still a relatively simple operation compared to the customary drum-building operation, as the fabrication of the shallow band 26 is readily automated. It will be understood that the sidewall portions 22 do not contain reinforcing cords, and that the elastomer in these portions must have the properties set forth hereinabove.

Figure 3:
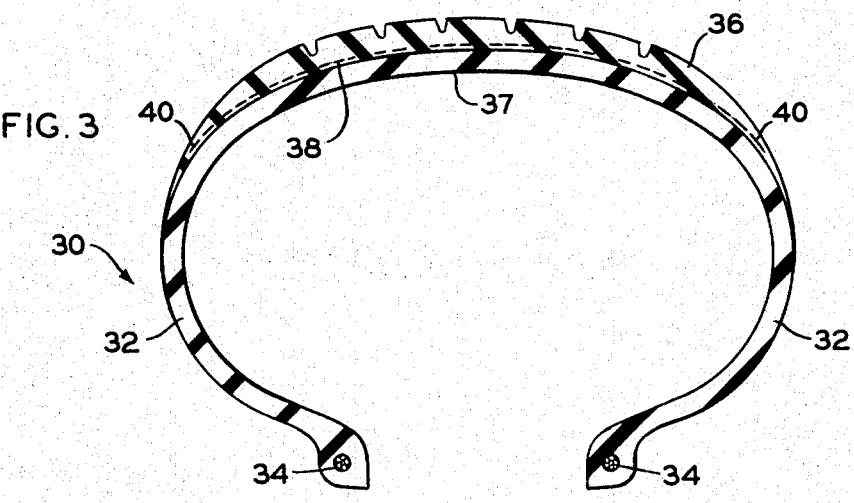

Referring now to FIG. 3, this shows a pneumatic tire comprising sidewall portions 32, under-tread portion 37, bead wires 34 and tread portion 36 reinforced with cords 38, corresponding respectively with the elements 22, 27, 24, 26 and 28 of FIG. 2, except that in this case the cords 38, instead of being confined to the immediate tread portion as in the case of FIG. 2, extend for a substantial distance down the sidewalls to the points 40. This construction can be manufactured by the procedure of laying the cord-containing tread and partial sidewall portion 36 into the centrifugal mold as a solid preform, followed by centrifugal casting of the remainder of the tire as in the case of FIG. 2. Again it will be appreciated that the sidewalls 32, below the termination 40 of the reinforcing cords 38, must be made of an elastomer having the properties set forth hereinabove.

With the foregoing general discussion in mind, there are given herewith detailed examples of the practice of this invention.

SWELLING DETERMINATION OF MOLECULAR WEIGHT BETWEEN CROSS-LINKS

The swelling test used in determining the molecular weight between cross-links in the examples hereinbelow was an adaptation of the procedure of Cluff et al. J. Polymer Sci. 45, pp. 341–45 (1960). Specimens were prepared by casting the finally compounded rubbers of Example I hereinbelow, while still flowable, into 1 inch test tubes, which were then heated in an oven at 110° C. for 2 hours to cure the polymer. The tubes were then cooled to 25° C., and broken to remove the specimens, which were then trimmed to form test pellets in the form of right cylinders approximately 0.70 inches in diameter × 0.85 inches in height, the exact dimensions being measured and recorded. One pellet of each elastomer was submitted to the following procedure, using chloroform as the swelling agent, and another pellet of the same elastomer was submitted to the same procedure, using tetrahydrofurane as the swelling agent. Each pellet was placed in a covered beaker containing a sufficient quantity of solvent (chloroform or tetrahydrofurane as the case might be) to immerse the pellet, and the covered beaker stored for 4 days at a temperature of 25° C. Those of the pellets which were immersed in chloroform were manually turned over each day to insure even exposure, as they tended to float in this solvent. It was made certain before proceeding further with the determination that the pellet contained imbibed therein at least 75 percent by volume of solvent.

Each of the resultant swollen test pellets was removed at the end of the 4 days' storage and tested in a compression test apparatus having two parallel flat platens, arranged to be moved toward each other and to measure
   a. the extent of such movement in mils and
   b. the force in pounds opposing such movement.

The pellet was placed in with one flat face down in a shallow pan which contained the same solvent as that with which the pellet was swollen, and the pan set upon the lower platen of the apparatus. The upper platen was then moved down into contact with the upper flat face of the test pellet, which downward movement was then continued while simultaneously measuring the distance of the movement and the force resisting the movement. These pairs of values for the pellet under test were then plotted on graph paper to yield a stress-strain curve (pounds ordinate vs. mils abscissa) having a straight line portion, and the slope of this straight line portion was then measured and used in the calculations to follow.

Cluff et al., loc. cit., give the following approximate formula for the cross-linking density as determined in their apparatus.

$$\nu_e/V = h_o S / 3 A_o RT \qquad (2)$$

where
$\nu_e/V$ = cross-link density
$h_o$ = height of unswollen pellet in centimeters
$S$ = slope of straight line portion of the stress-strain curve in cm²/gm
$A_o$ = cross-sectional area of unswollen pellet in cm²
$R$ = gas constant in gm-cm/degree Kelvin
$T$ = temperature, degrees Kelvin Since the present work was all done at 25° C., the dimensions of the pellet taken in inches, and the stress-strain curve measured in pounds vs. mils, (1 mil = 0.001 inch), formula (2) can be rewritten with conversion factors $$\frac{\nu_e}{V} = \frac{S_B \cdot (178,500) \cdot h_{oB} \cdot (2.54) \cdot 4}{3 \cdot (2.54 D)^2 \cdot (3.1416) \cdot (84,750) \cdot (298)} \qquad (3)$$

$$= \frac{.001199 \cdot S_B \cdot h_{oB}}{D^2_B}$$

where:
$S_B$ = the stress-strain slope in British units of pounds per mil
$h_{oB}$ = the unswollen height of the test pellet in British units of inches
$D_B$ = the unswollen diameter of the test pellet in British units of inches.

The molecular weight $M_c$ between cross-links was taken as the reciprocal of $\nu_e/V$, i.e., $$M_c = \frac{D^2_B}{S_B \cdot h_{oB} \cdot (.001199)}$$

Accordingly as the determination was made with chloroform or tetrahydrofurane as the swelling agent, the $M_c$ was recorded respectively as being between electrostatic cross-links or as being between covalent cross-links.

EXAMPLE I

| A. Preparation of Prepolymer | 300 grams |
| Poly(tetramethylene glycol) ("Polymeg 1000", a product of Quaker Oats Company having a weight of 1000) | |
| Tolylene diisocyanate | 104.2 grams |
| (mixed isomers; "Hylene T", manufactured by E. I. deNemours and company) | |

A series of prepolymers was prepared in accordance with the foregoing recipe, as set forth in Table I hereinafter. In each preparation there was employed a 2-liter round bottom flask provided with a rotary stirrer operating through a vacuum seal, and with a connection for the introduction of nitrogen and pulling of vacuum. In each run, the glycol was charged into the flask, a vacuum of 3–5 mm absolute applied, stirring commenced and the contents heated at 70°–80° C. for 4 hours to dehydrate the material, after which the mass was cooled. The flask was flooded with nitrogen and the calculated amount of tolylene diisocyanate, 2 mols per mol of the glycol, was poured into the glycol in the flask, with stirring and maintenance of the blanket of nitrogen in the free space above the glycol. When heat evolution had subsided, the flask was reclosed, the vacuum reapplied, and the contents stirred and heated for 1 hour, after which the mass was cooled to 25° C.

B. Final Compounding and Curing
| Prepolymer | 200 g. |
| (prepared as above described) | |
| MOCA | .80 – 1.10 equivalents per equivalent of NCO (per Table I) |
| (methylene bis-o-chloroaniline) | |

Each of the prepolymers prepared as above described was then compounded and cured into test specimens in accordance with the foregoing recipe. Based on the NCO analysis for the particular prepolymer, the amount of MOCA sufficient to provide the ratio of equivalents of MOCA/equivalent of NCO selected for that prepolymer was weighed out, melted, and rapidly introduced into the prepolymer in the original equipment. Vacuum was reapplied, the mixture stirred for 2 minutes, the vacuum released, and the mixture cast into molds patterned for various physical tests to be made thereon. The mixture was cured in the molds in an oven at 250° F. (121° C.) for 2 hours, and the cured specimens then cooled and subjected to physical tests as set forth herewith in Table I.

TABLE I

| | MOCA used | | Molecular weight between | | Vulcanizate properties | | | | |
| | | | | | Physical properties at 212° F. | | | | 5% modulus at 25° C. (p.s.i.) |
| Run No. | Grams | Equivalents per mol NCO | Electrostatic cross links | Covalent crosslinks | Tensile strength (p.s.i.) | Crescent tear strength (lb./in.) | Elongation (percent) | 300% modulus (p.s.i.) | |
| 1 | 68.1 | 0.85 | 1,230 | 2,500 | 1,430 | 241 | 170 | | 396 |
| 2 | 72.2 | 0.90 | 1,180 | 3,150 | 1,695 | 267 | 270 | | 420 |
| 3 | 76.1 | 0.95 | 1,300 | 5,050 | 2,030 | 282 | 350 | 1,710 | 425 |
| 4 | 80.2 | 1.00 | 1,080 | 5,100 | 2,550 | 295 | 400 | 1,830 | 430 |
| 5 | 84.2 | 1.05 | 1,050 | 24,000 | 2,990 | 348 | 595 | 1,520 | 464 |
| 6 | 89.9 | 1.10 | | a Soluble | 1,685 | 309 | 660 | 1,110 | 440 | a This polymer was soluble in the tetrahydrofurane, and hence the determination could not be run.

EXAMPLE II

CAST TIRE

A. Tread Compound

| | |
|---|---|
| Prepolymer | 5.5 lb. |
| (prepared by reacting "Polymeg 2000" | (2500 grams) |
| a poly(propylene glycol) of molecular weight 2000, manufactured by the Quaker Oats Company with "Hylene T" tolylene diisocyanate in a mol ratio of 2 mols diisocyanate/mol poly(propylene glycol) | |
| Silicone oil | 2 grams |
| ("DC-200", a product of Dow-Corning Company) | |
| Epoxy resin/carbon black blend | 50 grams |
| (V"-780" a product of Ferro Corp.) | |
| MOCA | 380 grams |
| B. Body Compound | |
| Prepolymer | 16 pounds |
| (as at "A" above) | (7270 grams) |
| Silicone oil | 7 grams |
| (as at "A" above) | |
| Epoxy resin/carbon black blend | 182 grams |
| (as at "A" above) | |
| Di(2-ethyl hexyl) phthalate | 1450 grams |
| MOCA | 1464 grams |

Each of the above compounds was prepared separately and injected into a centrifugal tire mold, the tread compound being injected first to form the tread, and the body compound being injected second to form the body of the tire.

The above recipe corresponds to Run No. 5 in Table I above. For each compound, there was provided a 20-gallon stainless steel pressure vessel provided with a power stirrer, a heating and cooling jacket, connections for supplying nitrogen and for pulling a vacuum in the free space of the vessel, and a valved discharge conduit at the bottom of the vessel. The prepolymer and all ingredients except the MOCA were charged together into the vessel under a blanket of nitrogen, and the vessel closed. A vacuum of 3–5 mm. absolute was then pulled on the vessel, and the contents agitated and heated at 162° F. (72° C.) for 2 hours, after which the vessel was opened and the free space in the vessel flooded with nitrogen. The MOCA was melted, supercooled to 99° C. and added to the vessel with stirring. The vacuum was then reapplied, and the mixture stirred for 3 minutes. Nitrogen pressure was then introduced into the vessel, and the contents blown out through the discharge conduit into a mold having, together with a collapsible core therein, a configuration complementary to a Firestone DeLuxe Champion 7.35:14 tire, and rotating about its axis at 700 rpm in a removable oven enclosure maintained at 250° F. The tread compound was blown in first and settled in the peripheral portions of the mold to form the tread portion as indicated at 16 in FIG. 1 of the drawing, and the body compound was blown in second to fill up the remainder of the free space in the mold to form the body portion 12, 13. The rotation and oven temperature were maintained for 2 hours, after which the oven enclosure was removed and the rotation continued in open air to cool the mold. At the end of this time, the rotation was stopped, and the tire stripped from the mold. Tires made as described above were subjected to the Department of Transportation Tests in accordance with the Motor Vehicle Safety Standards No. 109. The tire subjected to the endurance portion of the test, went 1,365 miles. The tire subjected to the high speed test, in which the speed is progressively increased over time, went to 125 miles per hour over a period of 0.8 hours.

EXAMPLE III

CAST TIRES — RANGE OF AMINE

A. Tread Compounds

| | |
|---|---|
| Prepolymer | 100 parts by weight |
| ("Adiprene L-100" a poly(propylene glycol) originally having a molecular weight of 1000, end-capped with tolylene diisocyanate. NCO content 4.1%. Product of E. I. duPont deNemours & Co.) | |
| Silicone Oil | 0.1 part by weight |
| ("DC-200" a product of Dow Corning Company) | |
| Epoxy Resin/Carbon Black Blend | 2.0 parts by weight |
| ("V-780", a product of Ferro Corp.) | |
| MOCA | 12, 13 or 14 parts by weight |

B. Body Compounds

| | |
|---|---|
| Prepolymer | 100 parts by weight |
| ("Adiprene L-167" a poly(propylene glycol) originally having a molecular weight of, end-capped with tolylene diisocyanate, NCO content 6.3%; product of E.I. duPont deNemours & Co.) | |
| Silicon Oil | 0.1 part by weight |
| ("DC-200") | |
| Epoxy Resin/Carbon Black Blend | 2.5 parts by weight |
| ("V-780") | |
| Di(2-ethyl-hexyl)phthalate | 20 parts by weight |
| MOCA | 19, 20 or 21 parts by weight |

A series of tires was cast from compositions in accordance with the foregoing recipe, using the procedure of Example II and varying the proportion of MOCA as indicated in connection with the various tires as listed hereinafter. Also specimens for various laboratory tests were also cast from the various compositions. The tread composition containing 14 parts of MOCA, and the body stocks containing 21 parts of MOCA, provide a ratio of equivalents of MOCA/equivalents of NCO of approximately 1.06.

Tire Durability

Four tires were cast in which the MOCA was varied in the stocks as indicated in Table II. These tires were run to failure on the RMA endurance test, with results as follows.

TABLE II

| MOCA Used (parts) | | Equivalent Ratios MOCA : NCO | | Endurance (miles) | Tire No. |
|---|---|---|---|---|---|
| In Tread | In Body | In Tread | In Body | | |
| 13 | 20 | 1.0 | 1.00 | 2640 | 1 |
| 13 | 20 | 1.0 | 1.00 | 2398 | 2 |
| 14 | 21 | 1.07 | 1.05 | 3486 | 3 |
| 14 | 21 | 1.07 | 1.05 | 3664 | 4 |

The superiority of the tires having a MOCA:NCO of ≥ 1.0 is quite striking.

Cut Growth

Tires were prepared, using a body stock containing 21 parts of MOCA, and varying the MOCA in the tread stock as indicated in Table III. The tires were subjected to the V.E.S.C. cut growth test, in which a total of 16¼ inch starting cuts are made in the bottom of the tread grooves, the tire run on a test drum for a specified time, and the total increase in length of the cuts measured and taken as the crack growth. The greater the increase, the poorer the cut growth resistance of the stock is considered. Following are the results.

TABLE III

| MOCA in tread (parts) | Ratio MOCA: NCO | Crack Growth (inches) | Tire No. |
| --- | --- | --- | --- |
| 13 | 1.00 | 13.21 | 5 |
| 14 | 1.07 | 0.00 | 6 |
| 14 | 1.07 | 0.33 | 7 |

Again the superiority of the tires according to the present invention is unequivocal.

Flex Data

DeMattia flex specimens were prepared from the several stocks, and subjected to the DeMattia flex test at 176° C. Following are the results.

TABLE IV

| Type of Stock | MOCA (used) Parts Used | Ratio MOCA: NCO | DeMattia Flex Life (cycles) |
| --- | --- | --- | --- |
| tread | 12 | .92 | 600 |
|  | 13 | 1.00 | 1000 |
|  | 14 | 1.07 | >2000,000 |
| body(a) without phthalate | 19 | .95 | 200 |
|  | 20 | 1.00 | 500 |
|  | 21 | 1.05 | 116,000 |
| body(b) with phthalate | 19 | .95 | 200 |
|  | 20 | 1.00 | 4500 |
|  | 21 | 1.05 | >200,000 |

(a) These body stocks were made from the recipe for body stocks at the head of this example, except that the di(2-ethylhexyl)phthalate was omitted.
(b) These body stocks were made in full accordance with the recipe for body stocks at the head of this example.

Cuttability

A series of body stocks were made in accordance with the body stock recipe and procedure, except that the ratio of equivalents of MOCA to equivalents of NCO in the prepolymer were varied as indicated in Table V. These stocks were subjected to a test in which a slab of the cured stock 5 × 1½ × ¾ inches is placed upon a flat support with one of the 5 × 1½ inches faces down. A ram carrying an anvil having a face 1½ inches long and one thirty-second inch wide moves down and forces the anvil into the upper face of the slab. The load required to force the anvil completely through the slab is taken as the "cuttability" rating of the stock. Following are the results.

TABLE V

| Ratio of Equivalents of MOCA to Equivalents of NCO | Cuttability Rating | Stock No. |
| --- | --- | --- |
| .850 | 1363 | 10 |
| .990 | 1825 | 11 |
| 1.025 | 1900 | 12 |
| 1.050 | 1813 | 13 |
| 1.100 | 1263 | 14 |

From the foregoing description and detailed specific physical examples, it will be evident that this invention provides novel pneumatic tires, air springs, hoses, power transmission belts and other articles which are subject to tensile stresses and dynamic flexure in service, which service the articles withstand wholly or largely without the complication of cord reinforcements. The articles can be made by labor-sparing and rapid-throughput processes, from conveniently obtainable and inexpensive starting materials. Tires in accordance with the invention are substantially free of time-dependent changes in configuration and properties, withstanding inflation at customary pressures without undue or uneven expansion, and without creep or deterioration of physical properties over a duration of time required of a tire in use. The tires are resistant to cuts, breaks and other road damage in service, and are highly resistant to cut growth, abrasive wear, and failure from flexure.

What is claimed is:

1. A tire
   I. a portion at least of the walls of which
      A. are without reinforcing fabric and
      B. are constituted of
         1. a vulcanized elastomer having
            a. tensile strength at 212° F. ≥1,800 psi
            b. crescent tear strength at 212° F. ≥200 psi
            c. DeMattia flex life at 176° F. ≥2×10$^6$ cycles
         and at ambient temperature
            d. Modulus of elongation of
               250–400 psi at 5 percent elongation
               1,100–1,300 psi at 100 percent elongation
               1,400–1,550 psi at 200 percent elongation
               1,600–1,800 psi at 300 percent elongation
               2,000–2,200 psi at 400 percent elongation
               2,800–3,500 psi at 500 percent elongation
            e. Tensile strength ≥2,800 psi
            f. Elongation ≥400 percent
         and
            g. Young's flexural modulus 10,000–15,000 psi
         the vulcanized elastomer more particularly having
            h. a molecular weight of 800–5,000 between electrostatic cross-links
         and
            i. a molecular weight of 5,100–40,000 between covalent cross-links.

2. A tire according to claim 1, wherein said elastomer is a polyurethane elastomer.

3. A tire according to claim 2, wherein the elastomer is prepared from a prepolymer synthesized from substantially equimolecular proportions of a polyalkylene glycol and a diisocyanate, which prepolymer is thereafter reacted with 0.98 – 1.08 equivalents of diamine per equivalent of isocyanate groups in the prepolymer.

4. A tire according to claim 2, wherein the elastomer is constituted of polyether chains connected to each other according to the repeating scheme $-[-P\:O-CO-NH-R_1-CO-NH-R_2-NH-CO-NH-R_1-NH-CO-O-]-$ wherein P represents a poly(alkylene ether) chain $R_1$ is the organic central group of a diisocyanate and $R_2$ is the organic central group of a diamine.

5. A tire according to claim 4, wherein the polyether chain P is the residue of poly(tetramethylene glycol).

6. A tire according to claim 1, which is cast by centrifugal casting from a liquid precursor of the elastomer and which tire has no reinforcing fabric in any portion thereof.

7. A tire according to claim 1, which is cast by centrifugal casting from a liquid precursor of the elastomer and which tire has reinforcing fabric in the read area thereof and has no reinforcing fabric in any other portion thereof.

8. A tire according to claim 7, which is cast by centrifugal casting from a liquid precursor of the elastomer and which tire has reinforcing fabric in the tread area and a portion only of the sidewall area, said portion being a portion contiguous to the tread area and has no reinforcing fabric in any other portion thereof.

* * * * *